Patented Sept. 18, 1934

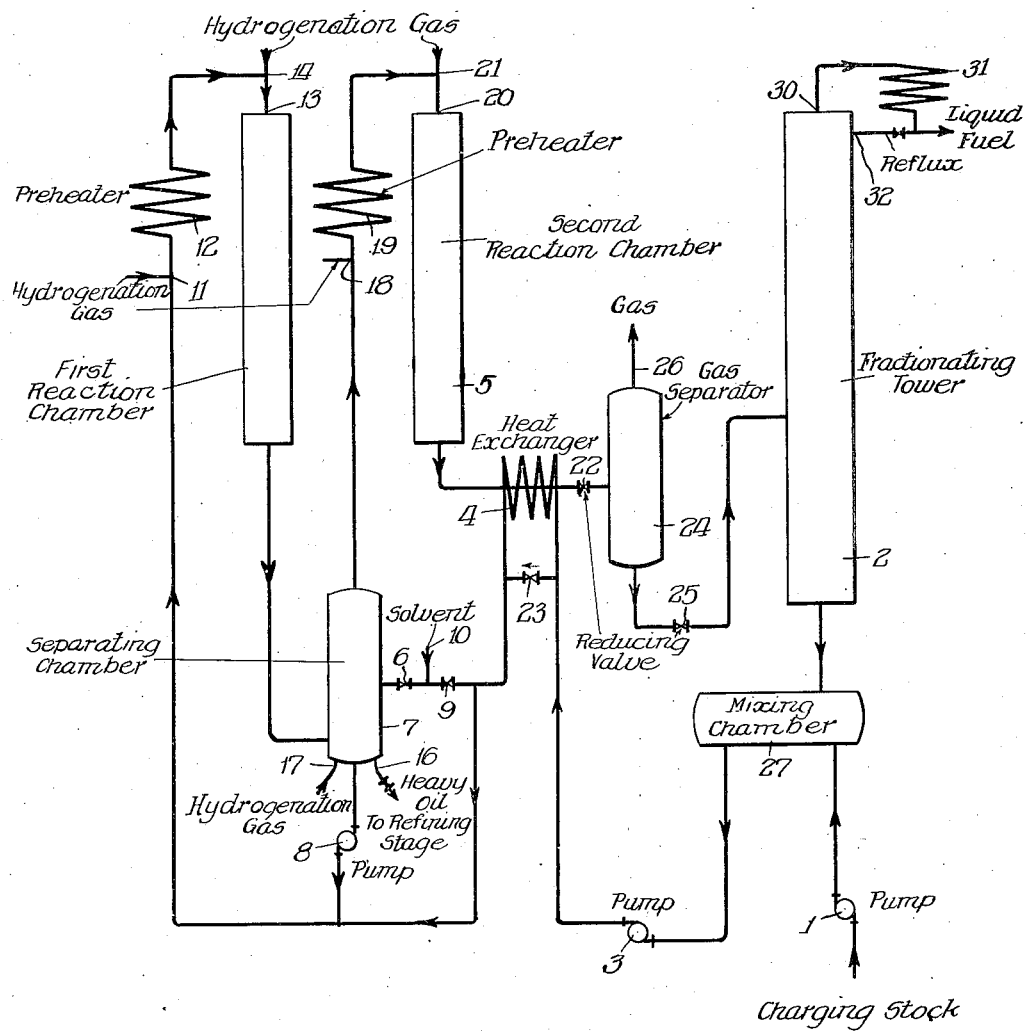

1,974,057

UNITED STATES PATENT OFFICE 1,974,057

TWO STAGE METHOD OF HYDROGENATION

Erich Steffen, Elizabeth, N. J., Brown Van Voorhees, New York, N. Y., and Leon W. Parsons, Westfield, N. J., assignors of three-fourths to Tide Water Oil Company, Bayonne, N. J., a corporation of New Jersey Application December 11, 1931, Serial No. 580,327

4 Claims. (Cl. 196—53)

This invention relates to an improved method of destructively hydrogenating hydrocarbonaceous materials. The process is applicable to crude mineral oils, their distillation products and residues or the products and residues of any refining operation. It is also applicable to tars and pitches and any distillation and hydrogenation products of these and similar materials as well as the coals themselves or their hydrogenation products, if they have been prepared in a fluid or pumpable form. In this process the hydrogen may be supplied by relatively pure hydrogen gas or by gases containing hydrogen in suitable quantities.

The primary object of this invention is to hydrogenate hydrocarbons in two definite stages of phase and temperature.

Another object of this invention is to hydrogenate the high boiling material at a low temperature in order that coke will not be formed.

It is also an object of this invention to hydrogenate the lighter oils, such as the gas oil formed or introduced, at higher temperatures in order to insure the formation of an anti-knock gasoline.

It is an object of this invention to control the reaction time in the low temperature stage by the addition of an oil, which is liquid under the reaction conditions and which will not take part in the reaction.

It is the final object of this invention to keep the heavy highly polymerized coke forming material in solution or well diluted with a lower boiling oil so that coke formation will be eliminated.

In order to insure the operation of this process, a separating vessel is maintained between the two stages in which a temperature below that of the first reaction stage is maintained. From this separating vessel the hydrogenating gases and vaporized hydrocarbons flow to the second stage for further hydrogenation at higher temperatures while the liquid products may be withdrawn for recirculation to the first stage or may be removed from the hydrogenating equipment for the recovery of lubricating oils formed in the first stage. The temperature is maintained in this separating vessel by the introduction of untreated oil in sufficient quantities and at proper temperatures. The oil so introduced may be the same oil as the charging stock or it may be an oil of entirely different character and boiling range. It is also possible at this point to introduce an oil liquid and stable under the reaction conditions, in which highly polymerized materials are soluble in order to prevent these from settling out to form coke in the separating and hydrogenating vessels. Such an oil may be a stable aromatic hydrocarbon of high boiling point, such as a coal tar fraction or such a material which has been hydrogenated, or any other suitable material in which highly polymerized materials are soluble.

If it is desired a suitable catalyst may be rigidly fixed in the reaction vessels, but it is also possible to introduce a catalyst dissolved or suspended in the oil introduced into the separating vessel. The catalyst may thus be circulated through the first reaction stage and may be withdrawn from the separating vessel when it is no longer active and fresh catalyst is introduced. In such a case it is impossible to use a fixed catalyst in the second reaction stage which may differ from that introduced into the separator.

In order to describe the process in more detail, the operation will be explained with reference to the diagrammatic sketch. The raw material enters pump (1) where it is raised to sufficient pressure to introduce it into a tank (27) where it is mixed with the gas oil recovered from the fractionating tower (2) and the mixture is then raised to a suitable pressure by pump (3). It may also be possible to introduce some or all of the gas oil from tower (2) to the high temperature stage. These mixed oils then flow through a heat exchanger (4) where the products from the high temperature reaction stage (5) give up some of their heat content. Some of the material may be by-passed through valve (23) in order to control the temperature of the products entering vessel (24). From the heat exchanger the charging materials flow to control valve (6) which allows a suitable amount of material to enter the separating vessel (7), the amount depending on the temperature of the charging materials and the temperature desired in the separating vessel. From the bottom of the separating vessel liquid material is withdrawn which passes through a circulating pump (8) and is then mixed with the remainder of the charging stock. It is also possible to introduce an oil of different characteristics than those of the charging stock or more of the original charging oil through valve (6) from pipe (10) and in such a case all of the original charging stock might be mixed with the recirculated heavy liquid from pump (8), valve (9) being closed so that only the quenching or solvent oil could enter the separating vessel. Naturally this oil will be brought to the proper temperature and pressure in a suitable manner and besides being introduced alone, may be introduced together with a certain amount of the charging oil, which would be controlled by valve (9). The mixture of the charging oil and the heavy oil from the separator (7) flows through a preheater (12) before which hydrogen or hydrogen-containing gas may be introduced in a desired amount at point (11). The preheated oil and gas then enter the first hydrogenation stage at (13) while additional hydrogenating gas may be introduced at (14). After flowing through this hydrogenation stage the oil and gas enter the separating vessel (7) where the material is reduced in temperature and the liquid material recirculated as described. It is also possible to withdraw liquid material from this vessel through the draw off (16) if it is desired to refine the heavy hydrogenated material in order to manufacture lubricating oils. Additional hydrogenating gas may be introduced at (17).

The hydrogenating gas and vapors from vessel (7) travel through a preheater (19) before which hydrogenating gas may be introduced at point (18) or after preheating at (21) as the material enters the secondary hydrogenating stage (5) at point (20).

The products of reaction leave the secondary hydrogenation stage and may be cooled in heat exchanger (4) by the mixed charging stock after which the pressure may be partially reduced by valve (22). The material then enters the gas separator (24) the hydrogen-containing gas and some of the gasoline formed leaving by pipe (26) for cooling and gasoline removal, treatment for the removal of hydrogen sulphide and fixed gas, if necessary, and recirculation. The cooling of the gas and condensation of the gasoline may be accomplished in part by exchange with the gas to be introduced into the process. The liquid products are withdrawn from the bottom through reducing valve (25) and are introduced into the fractionating tower (2) from which is taken motor fuel while the heavier fractions may be withdrawn by gravity and recirculated as described.

The motor fuel may be taken off as vapor at (30), condensed at (31) and a portion of the liquid fuel may be introduced at (32) as reflux in the fractionating tower.

In some hydrogenations it may be advisable to maintain a low temperature in separator (24) of approximately 20° C. which would be obtained by additional cooling and heat exchange equipment, not shown. In such a case a hydrogen rich gas would be withdrawn and recycled after suitable treatment to point (11) and/or (14). The liquid materials would be withdrawn from vessel (24) and pressure reduced to a suitable extent by valve (25) and released to a second separator, not shown, from which a hydrogen poor gas would be withdrawn and recycled after suitable treatment to points (18) and/or (21). The liquid material would be removed from the second separator and reheated by heat exchange in a pipe still or by any other suitable means and introduced into fractionating tower (2).

While it is not desired to fix the operating temperature of this process exactly, the approximate temperatures which will obtain are as follows: In the first hydrogenating stage the temperature will be from 380° to 480° C. and the pressure 200 atm. or higher, while the separating vessel will be maintained at 370° to 470° C. In the second hydrogenation stage a high temperature of 450° to 570° C. will be obtained, while the pressure will be held around 200 atm. or higher. In some hydrogenations it may be advisable to hold a higher pressure in the first stage for the liquid phase reaction and pressures of 300 atm. or even higher may be maintained in order to prevent heavy oils from building up coke. It may also be desirable to operate the second stage at pressures higher than 200 atms. and this process is not limited to definite pressures and temperatures.

We claim:

1. A process for the continuous high pressure hydrogenation of high boiling hydrocarbons to produce low boiling hydrocarbons in a low temperature stage and a high temperature stage, in which all the vapor and liquid products from the low temperature stage are separated into vapor and liquid in a separating zone maintained at a temperature below that maintained in the low temperature reaction stage, the temperature being controlled by the introduction of a fluid hydrocarbon in which heavy coke forming polymers are soluble into the separating zone from which the vapors pass to the high temperature stage of the hydrogenation, and liquid oil is returned to the low temperature stage of the hydrogenation.

2. A process for the continuous high pressure hydrogenation of high boiling hydrocarbons to produce low boiling hydrocarbons in a low temperature stage and a high temperature stage, in which all the vapor and liquid products from the low temperature stage are separated into vapor and liquid in a separating zone maintained at a temperature below that maintained in the low temperature reaction stage, the temperature being controlled by the introduction of a hydrocarbon which remains liquid under the reaction conditions of the low temperature stage and in which heavy coke forming polymers are soluble into the separating zone from which the vapors pass to the high temperature stage of the hydrogenation, and liquid oil is returned to the low temperature stage of the hydrogenation.

3. A process for the continuous high pressure hydrogenation of high boiling hydrocarbons to produce low boiling hydrocarbons in a low temperature stage and a high temperature stage, in which all the vapor and liquid products from the low temperature stage are separated into vapor and liquid in a separating zone maintained at a temperature below that maintained in the low temperature reaction stage, the temperature being controlled by the introduction of a mixture of untreated oil and oil boiling through a higher range than motor fuel recovered from a later step in the process and a fluid hydrocarbon in which heavy polymers are soluble into the separating zone from which the vapors pass to the high temperature stage of the hydrogenation, and the liquid oil is returned to the low temperature stage of the hydrogenation.

4. A process for the continuous high pressure hydrogenation of high boiling hydrocarbons to produce low boiling hydrocarbons in a low temperature stage and a high temperature stage, in which all the vapor and liquid products from the low temperature stage are separated into vapor and liquid in a separating zone maintained at a temperature below that maintained in the low temperature reaction stage, the temperature being controlled by the introduction of a fluid hydrocarbon in which heavy coke forming polymers are soluble containing a suitable catalyst into the separating zone from which the vapors pass to the high temperature stage of the hydrogenation, and liquid oil is returned to the low temperature stage of the hydrogenation.

ERICH STEFFEN.
BROWN VAN VOORHEES.
LEON W. PARSONS.

CERTIFICATE OF CORRECTION.

Patent No. 1,974,057. September 18, 1934.

ERICH STEFFEN, ET AL.

It is hereby certified that error appears in the printed specification of the above numbered patent requiring correction as follows: Page 1, line 69, for "impossible" read possible; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.